United States Patent  
Schlattmann et al.

(10) Patent No.: US 9,679,200 B2
(45) Date of Patent: Jun. 13, 2017

(54) IMAGE PROCESSING TO DERIVE MOVEMENT CHARACTERISTICS FOR A PLURALITY OF QUEUE OBJECTS

(71) Applicant: AGT INTERNATIONAL GMBH, Zurich (CH)

(72) Inventors: Markus Schlattmann, Griesheim (DE); Henning Hamer, Ravensburg (DE); Ulf Blanke, Zurich (CH)

(73) Assignee: AGT INTERNATIONAL GMBH, Zurich (CH)

( * ) Notice: Subject to any disclaimer, the term of this patent is extended or adjusted under 35 U.S.C. 154(b) by 0 days.

(21) Appl. No.: 14/415,585

(22) PCT Filed: Jul. 18, 2013

(86) PCT No.: PCT/EP2013/065174
§ 371 (c)(1),
(2) Date: Jan. 18, 2015

(87) PCT Pub. No.: WO2014/013012
PCT Pub. Date: Jan. 23, 2014

(65) Prior Publication Data
US 2015/0169954 A1    Jun. 18, 2015

(30) Foreign Application Priority Data
Jul. 18, 2013   (EP) .................................. 12176857

(51) Int. Cl.
*G06K 9/00* (2006.01)
*G06T 7/20* (2017.01)
*H04N 7/18* (2006.01)

(52) U.S. Cl.
CPC ............ *G06K 9/00624* (2013.01); *G06T 7/20* (2013.01); *H04N 7/18* (2013.01);
(Continued)

(58) Field of Classification Search
CPC ............ G06T 7/20; G06T 2207/10016; G06T 2207/30196; G06T 2207/30232; G06T 2207/30241; G06K 9/00624; H04N 7/18
See application file for complete search history.

(56) References Cited

U.S. PATENT DOCUMENTS 6,295,367 B1    9/2001  Crabtree et al.
8,855,364 B2 *  10/2014 Loos .................. G06K 9/00778
                                                 348/169
(Continued)

FOREIGN PATENT DOCUMENTS

CN    101727671 B    5/2012
DE    102007001649   7/2008
(Continued)

OTHER PUBLICATIONS

Amol Borkar et al.: "A Non Overlapping Camera Network: Calibration and Application Towards Lane Departure Warning", Jul. 2011.
(Continued)

*Primary Examiner* — Tom Y Lu
(74) *Attorney, Agent, or Firm* — Browdy and Neimark, PLLC

(57) ABSTRACT

In queues, persons—or objects (120) in general—move inside an area (110) to a target (112), such as to a counter. The queue has movement characteristics in terms of speed, waiting times and queue form. A computer-implemented approach obtains the characteristics by receiving a sequence (140) of image frames (141, 142, 143, 49) that represent the surveillance area (110); calculating flow vectors that indicate an optical displacement for the sequence (140) of image frames (141/142, 142/143); extending one of the flow vectors as lead vector in extension directions; determining intermediate vectors by using flow vectors along the extension directions; and selecting one the intermediate vectors as
(Continued)

the new lead vector. The steps are repeated to concatenate the lead vectors to the movement characteristics (190).

15 Claims, 9 Drawing Sheets

(52) U.S. Cl.
CPC ............... *G06T 2207/10016* (2013.01); *G06T 2207/30196* (2013.01); *G06T 2207/30232* (2013.01); *G06T 2207/30241* (2013.01)

(56) References Cited

U.S. PATENT DOCUMENTS

| | | | |
|---|---|---|---|
| 9,165,194 B2* | 10/2015 | Shreve | ............... G06K 9/00335 |
| 2005/0140783 A1 | 6/2005 | Akamatsu | |
| 2006/0007308 A1 | 1/2006 | Ide et al. | |
| 2008/0240616 A1 | 10/2008 | Haering et al. | |
| 2009/0040301 A1 | 2/2009 | Sandler et al. | |
| 2010/0245593 A1 | 9/2010 | Kim et al. | |
| 2013/0336583 A1 | 12/2013 | Ernst et al. | |

FOREIGN PATENT DOCUMENTS

| | | |
|---|---|---|
| EP | 1744292 A2 | 1/2007 |
| EP | 2309451 A1 | 4/2011 |
| GB | 2395551 | 5/2004 |

OTHER PUBLICATIONS

Barron J L et al.: "Systems and Experiment performance of Optical flow technique", International Journal of Computer Vision. Kluwer Academic Publishers, Norwell, US, vol. 12, No. 1, Jan. 1, 1994, pp. 43-77, XP001109171, ISSN: 0920-5691, DOI: 10.1007/BF0140984.

Burt P J et al.: "Object tracking with a moving camera" Visual Motion, 1989, Proceedings. Workshop on Irvine, CA, USA Mar. 20-22, 1989, Washington, DC, USA, IEEE Comput. SOC. PR, XP010014669. DOI: 10.1109/WVN.1989.47088. ISBN: 978-0-8186-1903-8.

Chen et al.: "Wide Area Camera Calibration Using Virtual Calibration Objects", Proceedings of Computer Vision and Pattern Recognition, pp. 520-527, 2000.

Chen and Leung: "Multi-Camera Tracking by Joint Calibration, Association and Fusion", Department of Electrical and Computer Engineering University of Calgary. Calgary, Alberta, Canada, 2011, IEEE.

European Search Report from EP12176857 dated Dec. 18, 2012.

European Search Report from EP2709058 dated Dec. 13, 2012.

Hu W et al.: "A Survey on Visual Surveillance of Object Motion and Behaviors", IEEE Transactions on Systems, MAN and Cybernetics: Part C: Applications and Reviews, IEEE Service Center, Piscataway, NJ, US, vol. 34, No. 3, Aug. 1, 2004, pp. 334-352, XP011114887, ISSN: 1094-6977, DOI: 10.1109/TSMCC.2004.829274.

International Search Report together with Written Opinion from PCT/EP2013/065174 dated Dec. 12, 2013.

International Search Report together with Written Opinion from PCT/EP2013/065183 dated Dec. 9, 2013.

Kanhere and Birchfield: "A Taxonomy and Analysis of Camera Calibration Methods for Traffic Monitoring Applications", Intelligent Transportation Systems, IEEE vol. 11 Issue 2, pp. 441-452, ISSN: 1524-9050, Jun. 2010.

Marta Wilczkowiak et al.: "Camera Calibration and 3D Reconstruction from Single Images Using Parallelepipeds", inria-00525657, version 1-26 May 2011.

Rahimi et al.: "Simultaneous Calibration and Tracking with a Network of Non-Overlapping Sensors", Proceedings of Computer Vision and Pattern Recognition, pp. 187-194, 2004.

Svoboda et al.: "A Convenient Multi-Camera Self-Calibration for Virtual Environments", Computer Vision Lab Department of Information Technology and Electrical Engineering Swiss Federal Institute of Technology and Centre for Machine Perception Department of Cybernetics, Czech Technical University in Prague. Revised version: Jun. 16, 2004.

Yao-Te Tsai et al.: "Multiple Human Objects Tracking in crowded Scene", 18th International Conference on Pattern Recognation (ICPR '06), vol. 3, Jan. 1, 2006, pp. 51-54, XP055046751, DOI: 10.1109/ICPR.2006.841, ISBN: 978-0-76-952521-1.

Yilmaz Alper et al.: "Object Tracking: A Survey", ACM Computing Surveys, ACM, New York, NY, US, vol. 38, No. 4, Dec. 1, 2006, pp. 1-45, XP007902942. ISSN: 0360-0300.

\* cited by examiner

IMAGE PROCESSING TO DERIVE MOVEMENT CHARACTERISTICS FOR A PLURALITY OF QUEUE OBJECTS

CROSS-REFERENCE TO RELATED APPLICATIONS

This application is a National Phase Application of PCT International Application No. PCT/EP2013/065174, International Filing Date Jul. 18, 2013, claiming priority of EP Patent Application No. 12176857.6, filed Jul. 18, 2012, which are hereby incorporated by reference in their entirety.

TECHNICAL FIELD

The present invention in general relates to image data processing for security surveillance, and more in particular relates to estimating movement characteristics for objects in areas under surveillance.

BACKGROUND

Observation or surveillance cameras are installed almost everywhere, but especially in areas where services are provided to customers. Just to give a few examples, the cameras transmit images from train stations, airports, streets or supermarkets. The images help the service providers to increase the quality of service and to sustain security. The providers monitor the images on screens in real time and/or watch offline recordings. Recordings are especially useful to investigate incidents. The terms "observation" and "surveillance" have slightly different meaning, with "surveillance" having a connotation towards safety and security. But in the following description, both terms are used as synonyms.

The lenses of the camera expose light to a sensor that periodically reads out the images. Consecutive images are called frames. The camera provides new frames in a time interval that is called "frame time". The light exposure time can be shorter than the frame time. In an alternative wording, the term "frame rate" indicates the number of frames per second (FPS). Depending on the frame rate, the images appear as a motion picture (or video, approximately 20 FPS or more), or appear as stand-still pictures. In principle, a camera catches every object that is in the field of view (FOV).

However, many usage scenarios deal with objects that are moving, such as passengers with or without luggage trolleys (e.g., in train stations or airports), or shoppers (e.g., in markets). Usually, multiple persons are being monitored. When waiting at service counters, the persons may line up in queues. In case that queues are getting longer, the service providers consider opening new service counters to decrease waiting times. However, situations might escalate to security hazards and event incidents when a queue turns into a crowd.

For service providers and security experts it is therefore of interest to know the properties of a queue—or queue characteristics—such as the number of persons in the queue, the waiting time it takes them to reach the counter, the shape of the queue, or the like.

Even for a person in the queue, some information is desirable to know, especially the waiting time.

The providers could identify some queue characteristics by having a dedicated operator constantly looking at the screen. The operator could count the persons in the queue, could trace a particular person to guess the waiting time, and so on. But usually, the operator looks at many screens simultaneously. Further, the operator has to pay attention to potential incidents so that manually determining the queue characteristics can not be justified.

However, calculating queue characteristics by computers faces constraints. This seems to be especially true for queues with persons. Queues that follow straight lines are quite exceptional. Queues tend to have irregular shapes. Persons in the queue move at different speed, and some persons leave the queue before reaching the target (leave-takers). Some persons just pass through the queue without joining. Other persons might accompany queuing people, but do not need to use the service counter. When reaching the counter, some people receive services in short time, some need more time. In some countries, individual persons in a queue should not be identified for data protection reasons.

Hence, there is a need to improve computer techniques for estimating movement characteristics of objects in queues.

SUMMARY

Embodiments of the present invention provide methods, computer systems and computer programs for estimating movement characteristics for objects in queues. There are two aspects to be distinguished. The first aspect relates to the objects in the area under surveillance (or observation), to the area itself and to the camera or other image capturing device that monitors the area. The second aspect relates to method, computer, and computer program to process images that are obtained from that area.

Looking at the first aspect, inside the area under surveillance ("surveillance area") there are queue objects that move to a target (or to a "destination"). Persons with or without luggage (or shopping carts) that are lining up in a queue are examples for such objects. A counter or any other place where service is provided to the persons is an example for the target. The target can be part of the surveillance area. Alternatively, the target can be located outside the area. The space in front of the counter is an example for the surveillance area. Location coordinates can be assigned to the surveillance area, to the objects and to the target, for example, by two-dimensional Cartesian coordinates (X,Y).

Further examples include vehicles waiting in front of a traffic sign. Multiple cameras can also be connected to observe areas that are larger than the FOV of a single camera.

The image data can be provided by surveillance cameras that are—as mentioned above—ubiquitously available. In an alternative embodiment, a camera can be especially dedicated for the purpose of deriving queue characteristics. In that case, the computer could be built into the camera. The camera forwards the images by a network or by any other suitable communication link. Instead of raw images, a camera with the built-in computer can forward data that is already been processed.

Looking at the second aspect, a computer comprises processing modules that use the images to estimate queue movement characteristics. The computer executes a method that is implemented in the computer. A computer program product can be loaded into the memory of the computer and can be executed by at least one processor of the computer to perform that method.

It does not matter if the images would appear on screen to a human operator as a video or would appear as a sequence of stand-still pictures; the computer processes the images as input data and provides the queue movement characteristics as output data.

More in detail, the computer receives a sequence of images, hereinafter "frames" or "image frames" that represent the surveillance area. In the frames, data coordinates (U, V) (or "image coordinates") represent the mentioned location coordinates (X, Y) in the surveillance area. Data coordinates are related to the optical resolution of the camera and are usually given in pixels (px).

The computer receives the frames by a frame rate, i.e. by a given number of frames (or images) per second (fps). The frame rate is predetermined by a variety of factors, for example, the physical properties of the camera, the bandwidth of the network between camera and computer, or the storage capacity of a recording medium. Usually, the frame rate is constant and does not change over time. Surveillance cameras typically use an economically justified frame rate of up to 30 frames per second (FPS). In the following description, the frame rate is assumed to be 10 frames per second. That rate corresponds to a frame time TF of 0.1 seconds.

The computer calculates flow vectors that indicate optical displacements for the sequence. In other words, if an object is moving inside the area, the optical flow follows that movement in the representing images. Non-moving objects, such as static objects in the background of the area, do not result in optical flow. Flow vectors are related to the data coordinates—the pixels—and to the frame time TF. The flow vectors could be illustrated by arrows. For example, the flow vector indicating a displacement of one pixel during one frame could be illustrated in a pixel grid coordinate as having the size of a grid cell.

The flow vectors are calculated by evaluating a history of vectors over a number of H frames, for example, during a time TH of 100 seconds. In other words, the vectors can be regarded as flow history vectors. This approach addresses some of the mentioned constraints. For example, effects resulting from speed differences or from objects passing through the queue without joining can be diminished. For example, the history is evaluated by averaging. There are several well-known averaging techniques available, such as to calculate an arithmetic average, a geometric average etc.

Due to the movement of the objects, there is a flow along the queue pointing to the target. Description and figures use vectors to illustrate that flow.

The computer further processes the optical flow to obtain the queue movement characteristics. Since the data coordinates (U, V) represent the location coordinates (X,Y), the location coordinate of the target can be represented by data coordinates as well. Starting with the flow vectors from the target, the computer could aggregate the flow vectors to a path that corresponds to the queue, especially to the shape of the queue. However, some flow vectors can have extreme values that correspond to random events in the surveillance area. For example, a person leaving the queue (a leave-taker) would not significantly modify the queue, but would cause a flow vector that points away from the path. Such flow vector would have an extreme numerical value because the persons may leave that queue at a speed higher than the speed of a person that remains in the queue. As a consequence the path would potentially drift away, and the shape of the queue would no longer correspond to the queue. To avoid that, the computer uses a step-by-step iteration. Vectors are selected and disregarded according to predefined rules. Selected vectors are concatenated to represent the queue movement characteristics. That approach increases the accuracy of the characteristics.

More in detail, the computer extends one of the flow vectors—the so-called lead vector—in a first extension direction and in a second extension direction. The term "lead" is added to identify a vector from others, in the sense that the vector serves as a basis for deriving data for further vectors. Once a vector has been extended by such a further vector, the further vector becomes the new lead vector.

The extension directions deviate from the original direction of the lead vector slightly, for example, by a predefined angle to the lead vector. The lead vector has a length in the order of magnitude from a fraction of a pixel to some pixels. Therefore, in the proximity of the lead vector along the extension directions, flow vectors are available. The extension directions indicate alternatives to investigate the optical flow. One direction points to data with "stronger" optical flow (i.e. longer flow vectors of the optical flow vector field), and the other direction points to data with "weaker" optical flow (i.e. shorter flow vectors of the optical flow vector field). The computer calculates intermediate vectors by using data from flow vectors in the proximity. The likelihood of object movement is higher for "stronger" optical flow, so that the intermediate vector that points to a "stronger" flow is selected as the next lead vector.

In other words, one of the vectors is called the lead vector. The direction of that lead vector is slightly modified. The direction is modified in the sense of introducing deviations of the direction. At least two options are available for the modification: there are at least two deviation directions. A further vector is coupled to that lead vector for one of the options in one of the deviation directions. Thereby the lead vector can be considered to be extended.

In repetitions, multiple lead vectors are selected. When concatenated to a path, the lead vectors represent the queue movement characteristics. The characteristics could be visualized on a computer screen to an operator. Since the vectors indicate displacement in relation to time (for example, frame time), and since the data coordinates (U,V) are related to the location coordinates (X,Y), the queue movement characteristics can comprise object speed (e.g., in meters per second) and object movement time (in seconds). Speed and movement time can be obtained from the characteristics. For persons in the queue, the movement time appears as estimated waiting time, and could be presented to them, for example, on display boards in the area.

In other words, a first vector indicates a general direction. That vector is referred to as the lead vector. Then, candidates in that general direction but with minor variations are checked for available flow. Candidates with the higher flow prevail and take over the role of the lead vector. In repetitions, a plurality of old and new lead vectors is successively formed to a poly line, a line with multiple portions. That line corresponds to the queue path, so that characteristics of the queue can be derived from that line.

In an implementation, a computer derives movement characteristics for a plurality of queue objects that move inside a surveillance area to a target. The computer comprises a flow module and a lead vector module. The flow module receives a sequence of image frames that represent the surveillance area and calculates flow vectors that indicate an optical displacement for the sequence of image frames. The lead vector module extends one of the flow vectors as a lead vector in a first extension direction and in a second extension direction, determines a first intermediate vector and a second intermediate vector by using flow vectors along the first extension direction and by using flow vectors along the second extension direction, selects one of the intermediate vectors as a new lead vector, and concatenates the lead vectors to the movement characteristics.

In an example implementation, the flow module initializes the extension by a flow vector that corresponds to location coordinates in the surveillance area near the target. The lead vector can be extended for directions that go away from the target. The intermediate vectors can be calculated by interpolation, for example, by bilinear interpolation. The new lead vector can be selected from the intermediate vector that represents the larger displacement.

In other words, the extension directions are deviations of the direction in that that the lead vector points to. The extension directions limit a proximity of the lead vector in that optical flow is used for calculating further vectors, i.e., the intermediate vectors. This approach saves computation, because the intermediate vectors are not calculated for complete surrounding of the lead vector, but for data with a certain likelihood of resulting in data that represents movement. In other words, extending broadens the direction of the lead vector to a pair of directions forming an angle of a triangle-shaped, or of circle-segment-shaped data area for that data is processed further, wherein data outside that area can be disregarded.

DETAILED DESCRIPTION OF THE DRAWINGS

Figure 1:
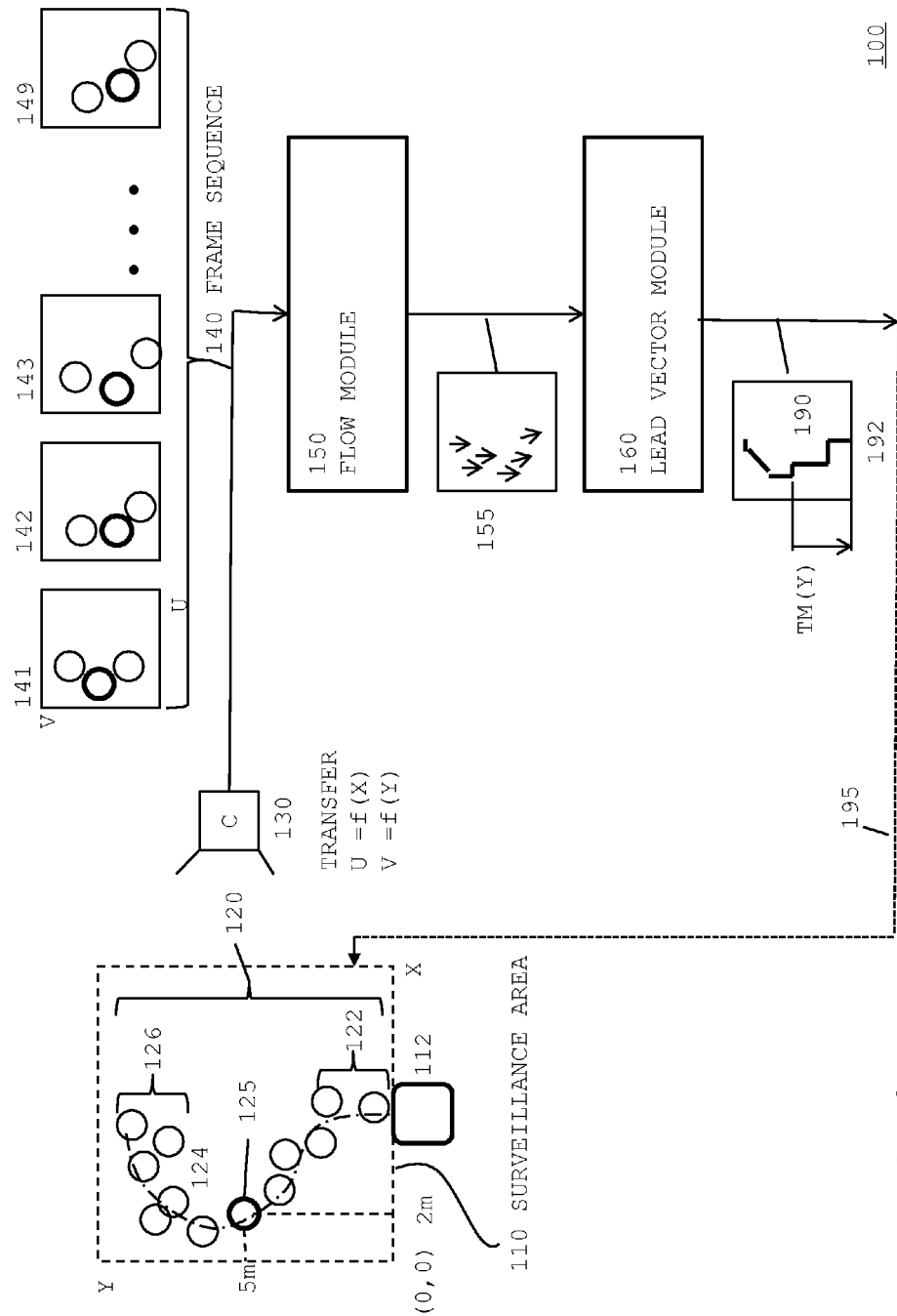
FIG. 1 is a block diagram illustrating a system for deriving queue characteristics.

FIG. 1 is a block diagram illustrating system 100 for deriving queue characteristics.

The first aspect with surveillance area 110, queue objects 120 and camera 130 is illustrated on the left side of the figure. The second aspect with processing modules 150, 160 of the computer is illustrated on the right side of the figure.

More in detail for the first aspect, surveillance area 110 is illustrated by a dashed frame as a view from above. A plurality of queue objects 120 (circle symbols, hereinafter "queue 120") is located inside area 110. Cartesian coordinates (X,Y) are associated with area 110. In the example, the coordinate origin (0,0) is shown in the left corner below; the X coordinate goes from left to right (0 to 10 m); and Y goes from below to the top (0 to 10 m). X and Y can be related to meters ("m") or other measurement units. Exemplary object 125 (bold circle) is shown at (2 m, 5 m).

As mentioned, the queue objects can be persons. In other implementation, the objects could be vehicles (e.g., on a road in front of a toll gate of a construction site), robots (e.g., in a factory), object floating in water (e.g., boots or debris), or animals. In a medical use scenario, ultrasound images could be evaluated, for example, to determine the speed of blood or the like.

Target 112 (or destination of queue movement) is associated with area 110. In the example, target 112 is located at the edge of area 110, approximately at (5 m, 0 m). The target could also be located inside area 110.

Queue 120 is also illustrated by the objects lining up along a center line (shown as chain line). In queue 120, some regions can be distinguished: queue head 122 is located near the target; tail 126 is the part of the queue in that new persons (or objects in general) join the queue. Body 124 is the region between head and tail. There might be other conventions. For example, persons joining a queue at tail 126 occasionally ask other persons if that is the "end" of the queue.

Queue movement is based on movement of objects in the queue. There is no need that all objects move, some of them might not move. In the example, objects from the tail move to the head. It takes the objects some time—the movement time—to reach the target. More related to the example, a person joining at the tail moves towards the target and perceives the movement time as waiting time.

The movement time can be related to a particular coordinate, for example, an object at tail 126 needs more time than an object in the middle of body 124. For example, a person at the position of object 125 is half-way through the queue.

Looking at camera 130, it has a field of view (FOV) looking to the area 110. If area 110 is located inside a building, camera 130 could be mounted on the ceiling to monitor area 110 from above. Or, camera 130 could be mounted elsewhere, to monitor the area from the side. In the example, camera 130 is not moving.

Camera 130 provides frame sequence 140 with frames 141, 142, 143 and 149. For example, the camera has a resolution of 1000×1000 pixels. Camera 130 applies an intrinsic transfer function between location coordinates of area 110 and data (pixel) coordinates of the image. In the example, both coordinates systems (X,Y) and (U,V) (cf. frame 141) are Cartesian systems. For simplicity, in the example, a transfer function can be assumed to be linear for $U=f(X)$ with 10 pixel in U corresponding to 1 meter in X; and for $V=f(Y)$ with the same pixel-to-meter ratio.

Persons of skill in the art can apply other transfer functions, for example, to mitigate distortions if the FOV is a side view.

Looking at the frames, consecutive frames follow with a frame time TF (e.g., 0.1 seconds). As illustrated in the figure, circle symbols indicate the objects. If visualized on a screen, the objects would appear to be moving. In the simplification of the figures, the movement is illustrated by different positions of the circle symbols. The bold circles represent object 125.

Turning to the second aspect, the computer is illustrated with flow module 150 and lead vector module 160. Flow module 150 receives frame sequence 140 (e.g., via the network) and provides optical flow 155. In the example, flow module 150 processes frames every TF; but alternative implementations can disregard some of the frames, so that for example every second frame is processed.

At the output of module 150, optical flow 155 is illustrated with optical flow vectors (or "flow vectors" in short) that are symbolized by arrows. Lead vector module 160 extends some of the flow vectors in extension directions, determines intermediate vectors and selects vectors for concatenating. Lead vector module 160 starts concatenating with vectors at pixel coordinates that correspond to the target location 192/112. In other words, concatenating goes against queue movement. Concatenated vectors form queue movement characteristics 190. As mentioned above, movement characteristics 190 include a movement time TM(Y). In the example, TM(Y) is the estimated movement time for an object with a given coordinate (e.g. Y-coordinate) to the target. For example, object 125 (left side of area 110) has a Y-distance to target 112 of approximately 5 meters. Movement characteristics indicate the estimated time to target.

Movement characteristics 190 include the shape of the queue as represented by concatenated vectors. For example, the shape roughly corresponds to the center line; or in other words, the shape is a reconstruction of the arrangement of objects in the queue obtained by image processing. Although illustrated by symbolic pictures, there is no need to present optical flow 155 or movement characteristics 190 visually to a human operator. That might however be convenient. For example, characteristics 190 could be presented to the operator on the computer screen, the operator could move a pointer (e.g. a mouse pointer) over the shape and read the movement time TM(Y) for different positions along the queue. Or, in a real-time presentation to the operator, the path (cf. FIG. 6) could be superimposed to the frames on screen, and estimated movement times could be added by digits next to the path. Details for such visualization are illustrated in connection with FIG. 9.

As mentioned, the movement time appears to persons in the queue as estimated waiting time. Dotted line 195 from module 160 to area 110 indicates that the waiting time (or other information) could be presented to persons in the queue, for example, via display boards or via smartphones.

The computer modules 150 and 160 process data from a large volume (e.g., 1000×1000 pixel arriving every 0.1 second) to a relatively small volume (e.g., a number of concatenated vectors). Details for the operation of the computer modules will be explained in connection with the following figures.

Figure 2:
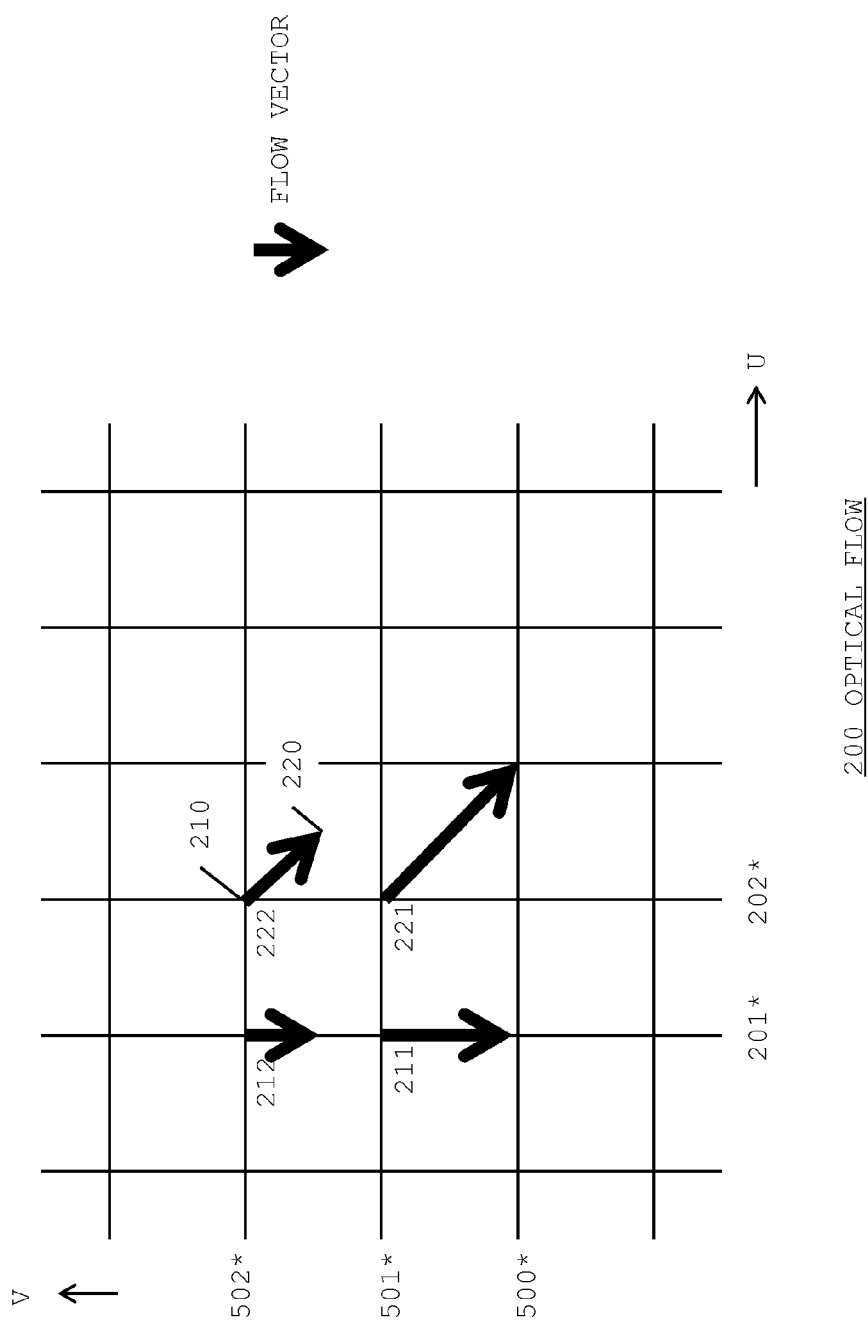
FIG. 2 is a diagram illustrating an optical flow at pixel level.

FIG. 2 is a diagram illustrating an optical flow 200 at pixel level. Optical flow 200 is calculated by the flow module (cf. 150 in FIG. 1). As mentioned, there is no need to present flow 200 to a user. The figure is just given for illustration. In literature, optical flows are sometimes illustrated by color code, with color representing direction. The figure illustrates the direction of the optical flow by vector arrows. Thin lines indicate a coordinate grid in pixel coordinates (U,V). In the example, the coordinates are spaced at a cell distance of one pixel. Pixel coordinates are given with an asterisk * to distinguish them from location coordinates and from reference numbers.

In the example, the diagram illustrates a portion of the flow. Only the data vectors are shown that correspond to the location of object 125 with U-coordinates 201* und 202* and V-coordinates 501*, 502* approximately corresponding to X=2 m and Y=5 m of object 125 in surveillance area 110 (cf. FIG. 1).

Flow 200 has flow vectors, for example, flow vectors 211, 212, 221, 222 (arrow symbols) that are given with location and displacement. The vectors have start coordinates 210 and end coordinates 220 (shown for vector 222). The start coordinates are data coordinates with integer values. For example, flow vector 222 has start coordinate 210 at (202*, 502*); flow vector 212 has start coordinate (201*, 502*); flow vector 211 has start coordinate (201*, 501*), and flow vector 222 has start coordinate (202*, 501*). The direction and the length of the vectors indicate average displacement during TF. For example, flow vector 222 has end coordinate 220 at approximately (202.5*, 501.5*), that is displacement (0.5, −0.5), with "positive" X-direction and "negative" Y-direction (to the target).

Flow vector 211 indicates a displacement (0,1) by one pixel in negative Y-direction, but no displacement in X-direction. For optical flows that are derived from the frame sequence, the data coordinates can have non-integer, real values.

In the figure, the length of the vector indicates speed (in the example, 1 pixel per frame), the speed can be derived from the displacement. For example, flow vector 222 has a length indicating a speed of half a pixel per frame time TF.

The amount of data to be processed can be reduced by measures explained in the following. Flow module 150 obtains the optical flow by comparing consecutive images, for example, image 142 to image 141, image 143 to image 142 and so on. The pixel displacements can also be obtained from a history that is longer than a single frame time. The speed of the objects in the area viewed by the camera translates into displacement over time in the images. According to the transfer function of the camera, the speed of the objects can be calculated from the displacement.

Averaging overtime is an option. For example, H points in time (cf. FIG. 8) or a number of H frames can be used, so that the optical flow is calculated over a given time period. The number of samples can be H=1000 (corresponding to 1000 frames, or 100 seconds).

Data reduction has the effect of filtering out data inconsistencies. Such data inconsistencies can result from object behavior that leads to the above-mentioned constraints. For example, a person passing through the queue would cause a flow in a direction that is perpendicular to the flow prior to passing. Averaging would simplify the flow so that in further calculations, the passing event does not much harm.

Figure 3:
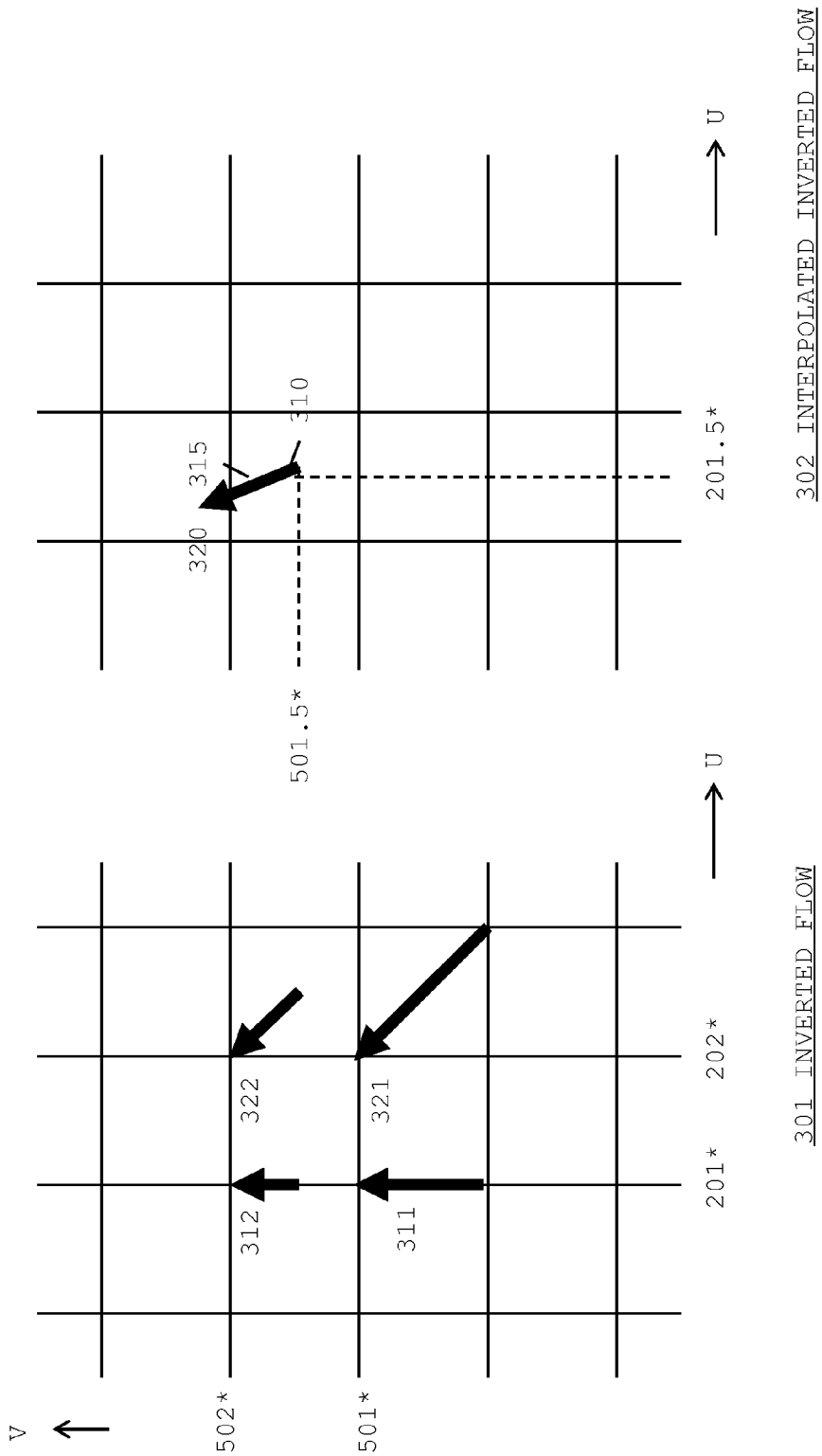
FIG. 3 is a diagram illustrating an inverted flow and an interpolated inverted flow.

FIG. 3 is a diagram illustrating an inverted flow 301 and an interpolated inverted flow 302. Since vector concatenation conveniently starts at data coordinates that correspond to the location of the target (cf. 192 in FIG. 1), the description continues with an against-the-queue order. Using the same coordinate system as in FIG. 2, the direction of the flow arrows can simply be changed. In inverted flow 301, vector 312 is inverted to vector 212 (FIG. 2), vector 322 is inverted to vector 222, vector 311 is inverted to vector 211, and vector 321 is inverted to vector 221. The inversion is just given for illustrative purposes. The computer processes the vectors as data sets, usually without displaying them. If used, an inversion can be accomplished easily, for example, by replacing start and end coordinates of a vector. Again, the description uses the inversion to simplify the presentation: inverted arrows better illustrate vector concatenation within data coordinates from the target back to any position in the queue.

As explained above in FIG. 2, averaging overtime is possible, but averaging over location is possible as well. Data is used more efficiently and random data inconsistencies are leveraged out. For example, vectors can be interpolated. Interpolated inverted flow 302 has vectors for that start coordinates 310 and end coordinates 320 are usually non-integer data coordinates.

In the example, vectors 312, 322, 311, 321 are interpolated with an interpolation center (being start 310) in the middle of the square formed by vectors 312, 322, 311, 321. Other ways to select a center point for interpolation are also applicable. For the center location (201.5*, 501.5*), an interpolating technique is applied. The example uses bilinear interpolating that is well known in the art of image processing. The vector that results from interpolation—resulting vector 315—starts at the center location. Vector 315 has a direction that is averaged from the directions of original vectors 312, 322, 311, 321 and has a pixel displacement at approximately the average displacement of these original vectors.

Instead of interpolation, other techniques for identifying a resulting vector are possible. For example, the resulting vector can be the vector that is nearest to the center, or the resulting vector can be the longest vector. Other options are possible, as long as the resulting vector is calculated according to predefined rules. In view of computation by the computer, some rules consume more processor time and memory than others, the example of the figures indicate rules that seem to be optimized.

Figure 4:
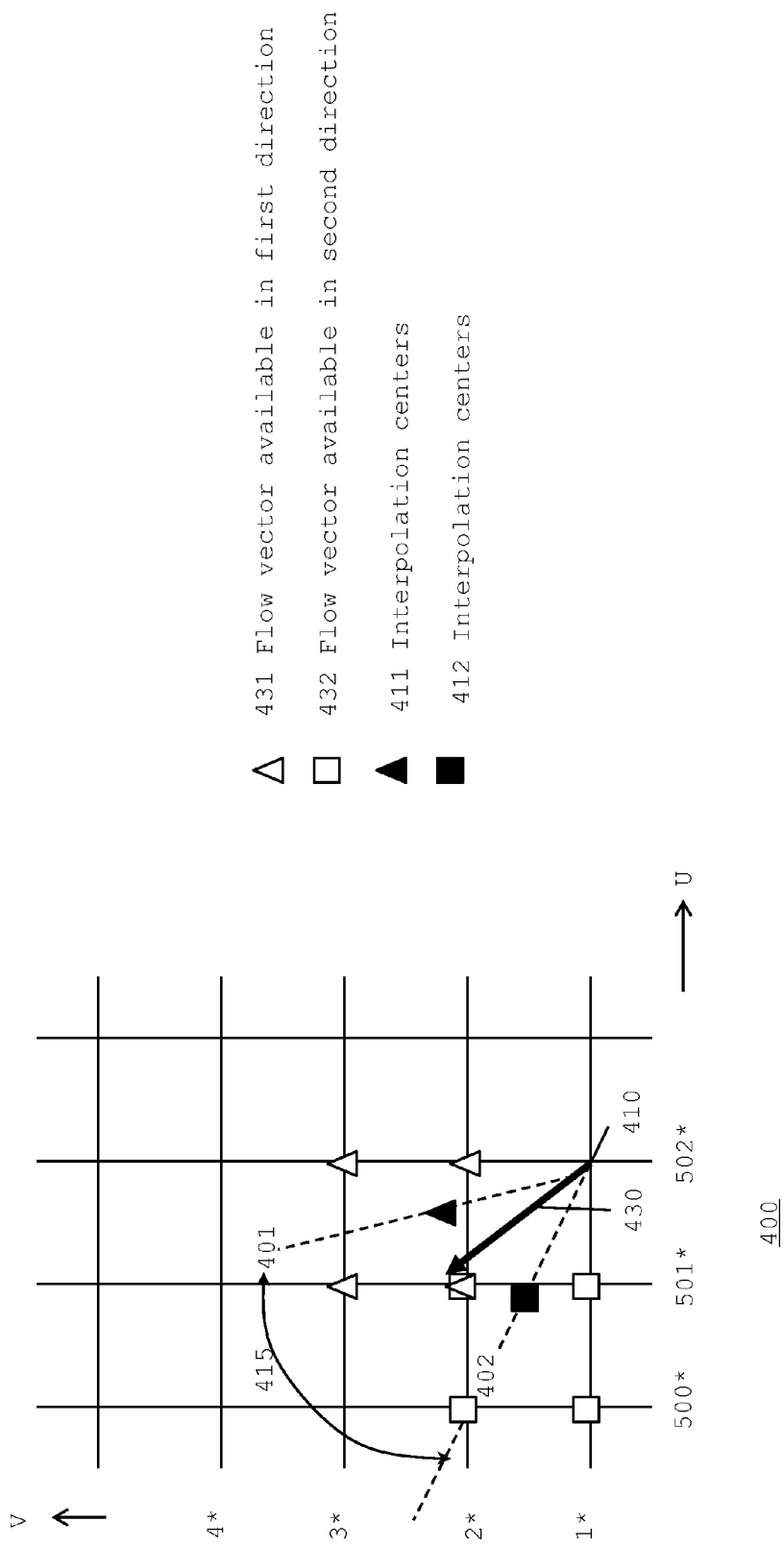
FIG. 4 is a diagram illustrating the extension of a lead vector to a first extension direction and to a second extension direction.

FIG. 4 is a diagram illustrating the extension of a lead vector to a first extension direction and to a second extension direction. The figure uses the data coordinates of FIGS. 2-3 but guides the attention to a location near the target, at approximately (500*, 1*). From here, vectors are concatenated to represent the movement characteristics of the queue. But before concatenating, vectors are calculated, selected or disregarded.

As described, a vector is calculated from an optical flow, here shown as vector 430. The vector has the function of a lead vector that leads (or points) into the direction of the queue. In the example, lead vector 430 is an inverted vector with approximately one pixel in negative U-direction and one pixel in V-direction per frame.

Since lead vector 430 has been calculated from a relatively low number of data points, for example, by interpolation from 4 flow vectors, vector 430 could point to a direction that is different from queue movement.

To alleviate that potential issue, prior to concatenating with other vectors, the lead vector module (cf. 160 in FIG. 1) checks for the availability of optical flow (i.e., object movement) in the proximity. Deviation directions 401 and 402—indicated by dashed lines—are arranged by a predefined angle in relation to vector 430. For example, vectors 401 and 402 are shifted by angles of about 30° right and left to the lead vector. Overall angle 415 between both directions 401 and 402 is larger than or equal to 10° or smaller than or equal to 90° (right angle). In the example, overall angle 415 is about 60°. Using a symmetric arrangement (equal angle in both directions) is not required. In an extreme case, one of the deviation directions could be identical with the direction of the lead vector.

White triangle symbols 431 show the availability of flow vectors in proximity of direction 401. White square symbols 432 show the availability of flow vectors in proximity of direction 402. A black triangle symbol 411 shows an interpolation center along the deviation direction 401; black square symbol 412 shows an interpolation center along the deviation direction 402. In the example, both interpolation centers have equal distances to the start of the lead vector (as if a circle segment would have been drawn around the start coordinate 410 of vector 430).

Figure 5B:
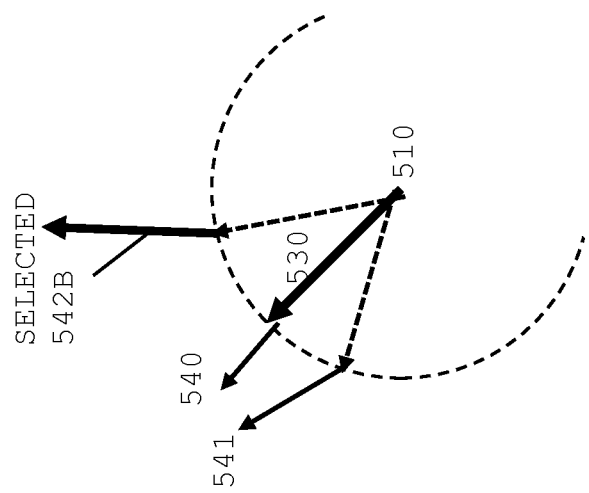
FIGS. 5AB are diagrams illustrating the selection of lead vectors from intermediate vectors.

Using the available data (i.e., flow vectors and interpolation centers), the lead vector module calculates further vectors. The further vectors can originate, for example, in the interpolation centers. These further vectors are intermediate vectors. One intermediate vector will be selected for concatenating, the other intermediate vector will be disregarded (FIGS. 5-6).

Persons of skill in the art can modify this approach, for example, by increasing or decreasing the number of flow vectors per direction. Also, the interpolation centers can be defined differently; there is no need to arrange them on the circle segment. The number of deviation directions can be modified as well; more deviation direction may require more computation power, but result in higher accuracy.

Figure 5A:
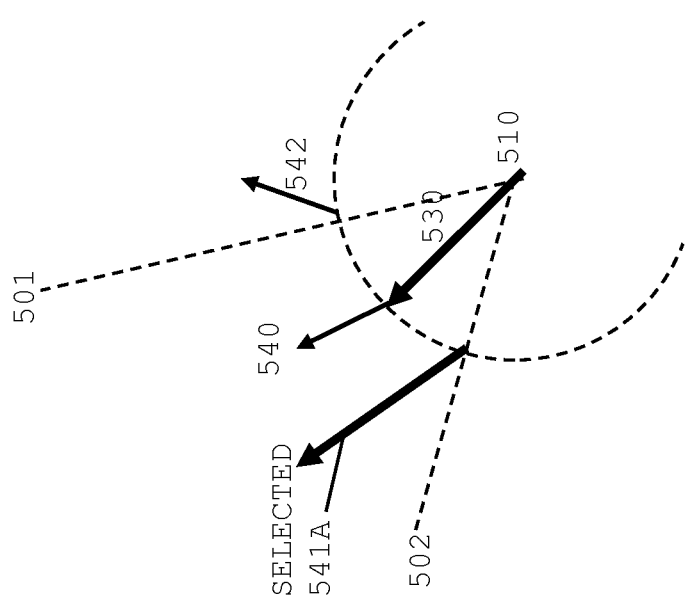
Figure 6:
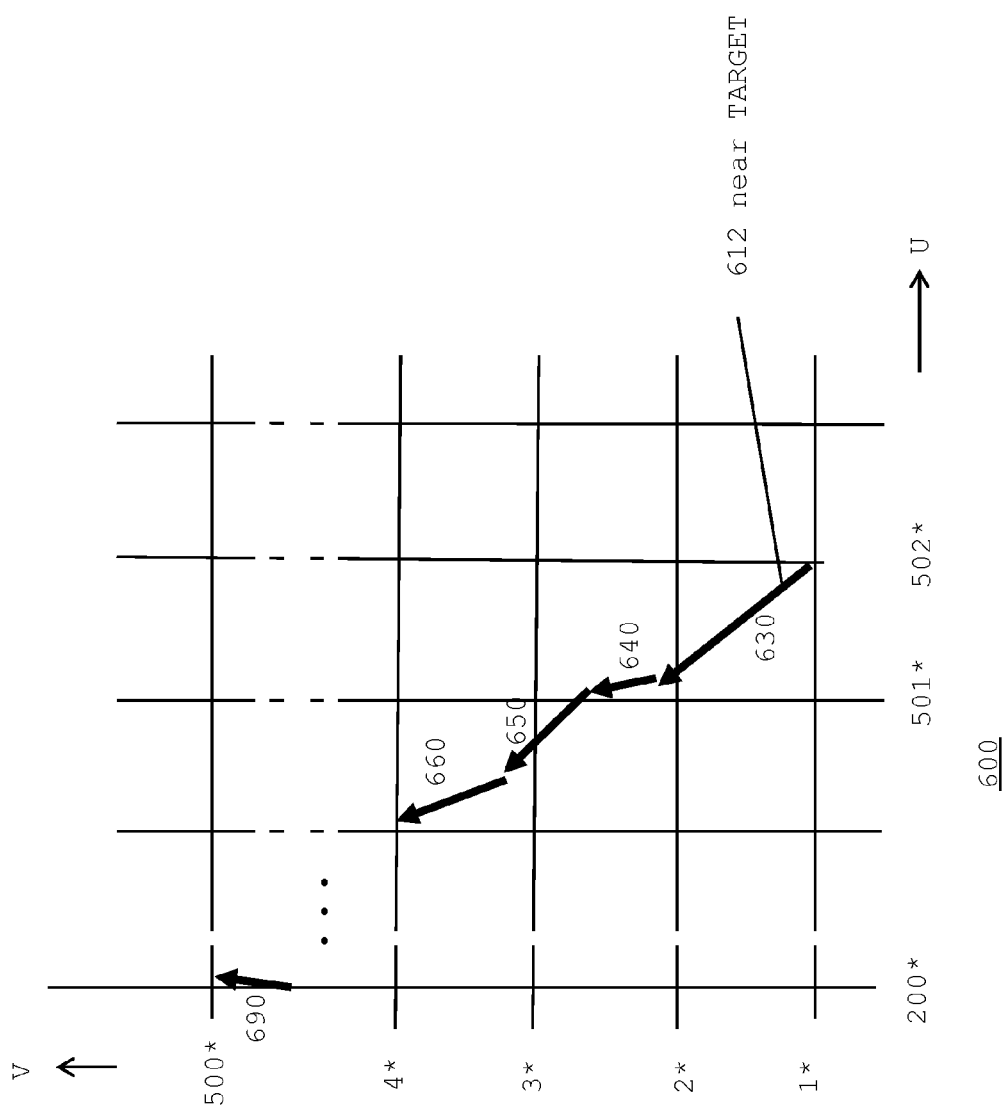
FIG. 6 is a diagram illustrating the concatenation of multiple lead vectors to represent queue movement characteristics.

FIG. 5AB are diagrams illustrating the selection of lead vectors from intermediate vectors. Lead vector 530 has two deviation directions 501, 502 (dashed lines). A circle segment around start point 510 of vector 530 has a radius at the length of vector 530. The crossing points between circle segment and deviation directions indicate interpolation centers. From there intermediate vectors 541, 541 (541A), 540 and 542 (542B) are obtained by interpolation from flow vectors.

In the example, the flow vectors are assumed to be different in FIGS. 5A and 5B, the intermediate vectors are therefore different as well. Intermediate vectors 540, 542 (FIG. 5A) and 540, 541 (FIG. 5B) are shorter than intermediate vectors 541A (FIG. 5A) and 542B (FIG. 5B). The "longer" vectors are selected; these are the vectors with larger displacement. In case of FIG. 5A, new lead vector 541A would be concatenated to old lead vector 530; and in case of FIG. 5B, vector new 542B would be concatenated to old vector 530. Both concatenated vectors result in the movement characteristics, in the example of a small portion of the queue.

In the example shown in the figure, the start point of the new lead vector is shown as not directly connected to the end point of the old lead vector, but shown as slightly shifted by a short fraction of the circle segment. The term "concatenate" is understood to include such cases.

FIG. 6 is a diagram illustrating the concatenation of multiple lead vectors 630, 640, 650, 660, and 690 to represent queue movement characteristics 600. In repetitions, lead vectors are extended, intermediate vectors are calculated and new lead vectors are selected. In the example of FIG. 6, the first lead vector has (U,V) coordinates that corresponds to the (X,Y) coordinates of the target location 612 (cf. 112, 192 in FIG. 1). For simplicity, FIG. 6 does not show all vectors, but symbolizes some vectors by an ellipsis. The last lead vector 690 is, for example, the 300th lead vector because a V-coordinate corresponds to the Y-coordinate of an object for that the movement time should be estimated.

Since the vectors are normalized in time to a displacement during TF, 300 lead vectors correspond to 300 times TF. In the example, 300 times 0.1 second results in 30 seconds movement time TM. In other words, an object located at (X,Y)=(2 m, 5 m), corresponding to (U,V)=(200*, 500*) would reach the target in approximately that 30 seconds time.

The concatenation of lead vectors represents the queue movement characteristics.

When the lead vectors are concatenated, the huge amount of data from the frame sequence has been reduced to a relatively small data set in the form of vector data. In addition to that, intermediate vectors had been tested and selectively selected or disregarded so that the matching accuracy between the characteristics (and reality (i.e., FIG. 1, objects in queue).

Figure 7:
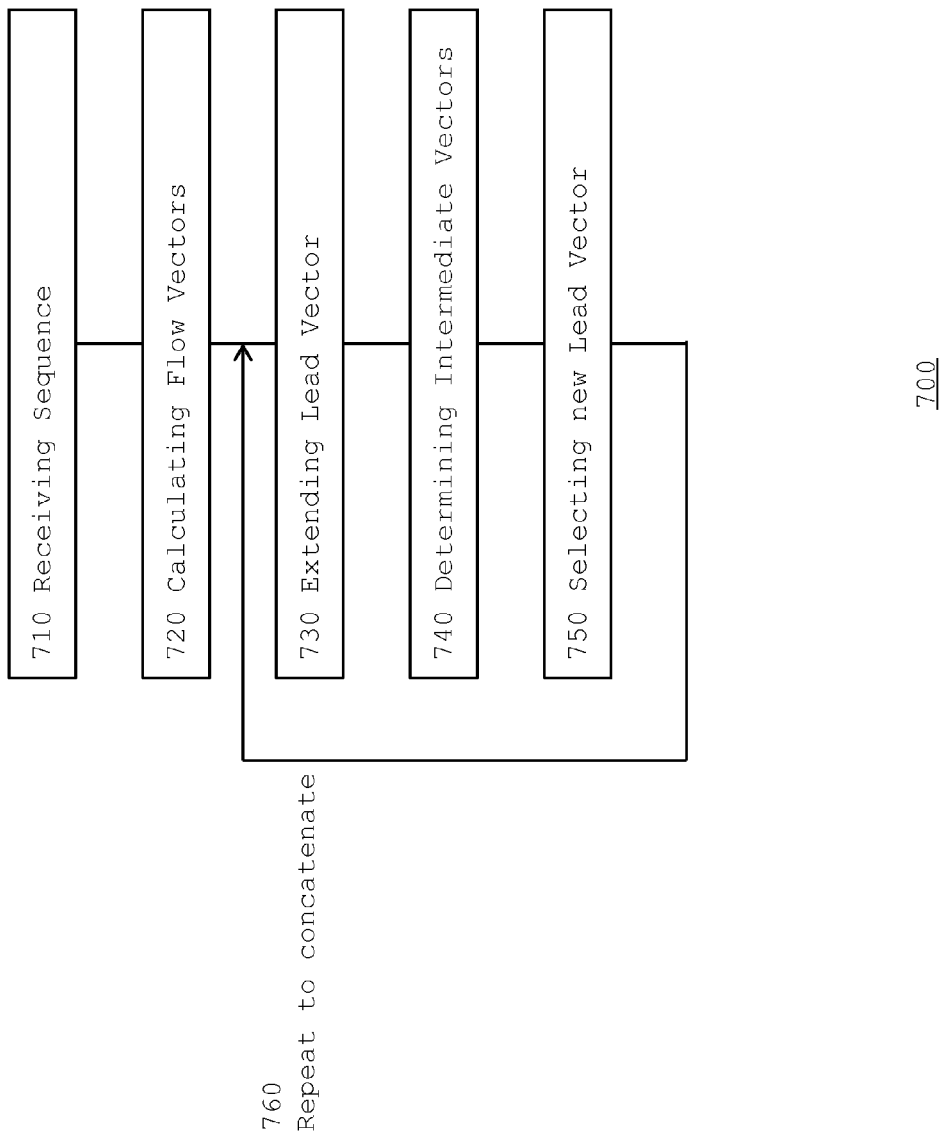
FIG. 7 is a flow chart diagram of a method.

FIG. 7 is a flow chart diagram of computer-implemented method 700. Method 700 is a method for deriving movement characteristics (cf. 190, 600) for a plurality of queue objects that move inside a surveillance area to a target.

In a receiving 710 activity, the computer receives a sequence 140 of image frames 141, 142, 143, 149 that represent the surveillance area. Data coordinates (U,V) in the frames represent location coordinates (X,Y) in the surveillance area.

In a calculating 720 activity, the computer calculates flow vectors 212, 222, 211, 221 that indicate an optical displacement for the sequence 140 of image frames. The flow vectors are calculated for a number of frames (H), in other words a history is obtained. As illustrated, the activities can be implemented by a flow module.

In an extending 730 activity, the computer takes one of the flow vectors as a lead vector and extends this lead vector in a first extension direction and in a second extension direction.

The computer then determines 740 a first intermediate vector and a second intermediate vector. Thereby, the computer uses flow vectors along the first extension direction and flow vectors along the second extension direction.

Having determined the intermediate vectors, the computers selects 750 one of the intermediate vectors as the new lead vector. Extending 730, determining 740 and selecting 750 is repeated to concatenate the lead vectors to the movement characteristics (190, 600). As illustrated, the activities can be implemented by the lead vector module. The implementation could follow a modified approach, for example, by implementing modules that are dedicated for the steps.

When the (X,Y) and (U,V) coordinates of the target are available, extending 730 the lead vector can be initialized by a vector that corresponds to location coordinates (X,Y) in the surveillance area near the target. In the figures, this is illustrated by vector 630.

In such a case, extending 730 the lead vectors can be performed for directions that go away from the target. This is illustrated in the figures, for example, by an inverted vector as lead vector (e.g., 530, 630) in combination with deviation directions. Vector and direction are pointing away from the target.

Looking at the intermediate vectors, an embodiment calculates them by interpolation, for example, by bilinear interpolation. In other implementations, the computer can use a different scheme. In most of the cases, the computer derives the intermediate vectors from vector data at coordinates in the proximity of the lead vectors.

Selecting 750 one of the intermediate vectors as the new lead vector follows predefined rules, and can be performed for that intermediate vector that represents the larger displacement of the intermediate vectors. In the figures, the optical displacement is illustrated by the length of the vector. There are other options available, such as color coding for the direction and length coding for the value (or intensity) of the displacement.

Looking at the result of the method, i.e. at the movement characteristics, there are several possibilities to derive information from them. The movement time (TM) corresponds to the number of lead vectors (630, 640, 650, 660, 690). The movement time (TM) can be related to a location coordinate (X,Y) of the queue object (125). The characteristics (190, 600) can include a queue length that can be obtained by taking the transfer function into account. For example, the queue length can be derived by adding up the lead vectors (in pixels) and applying the transfer function (pixel/meter ratio) to obtain the length in reality. The characteristics can include the identification of a queue tail (cf. 126) by a location in that the flow vectors following the movement characteristics go below a threshold value.

Figure 8:
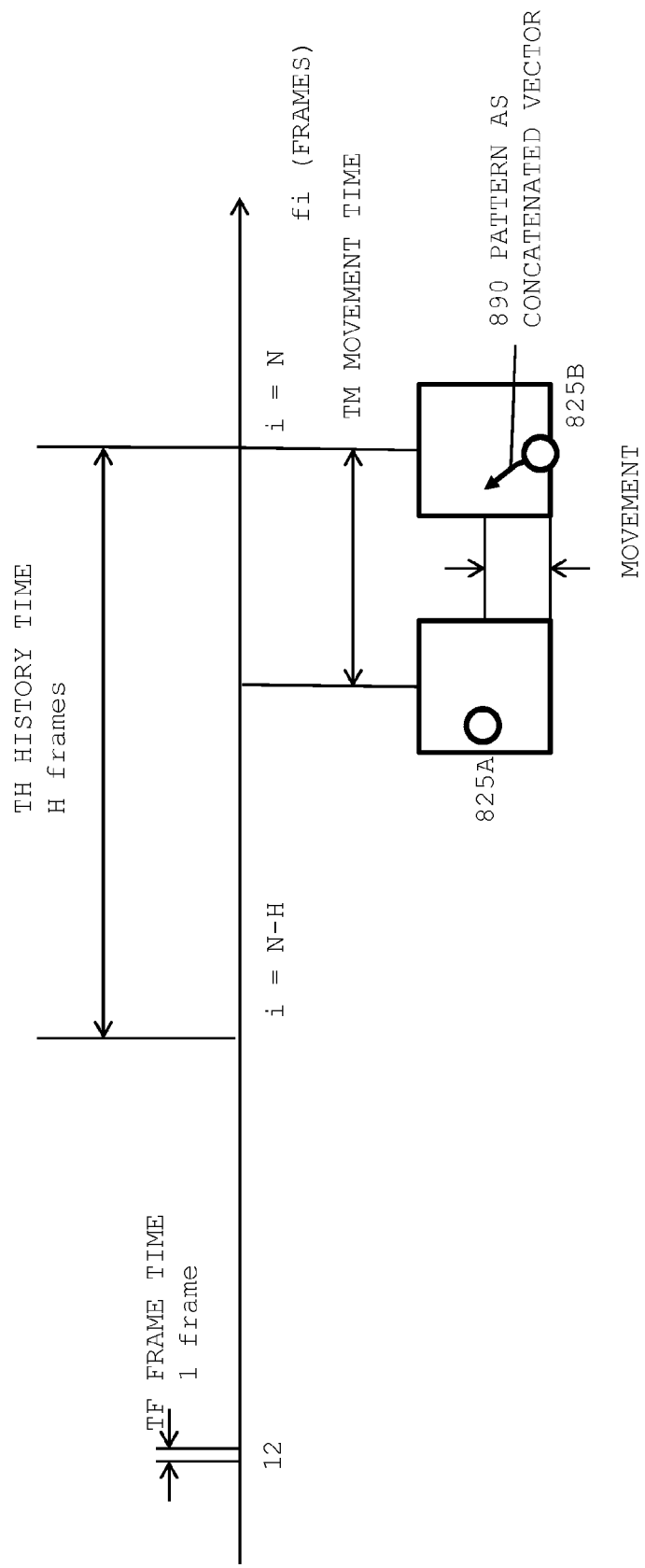
FIG. 8 is a timing diagram of the method.

FIG. 8 is a timing diagram to get an overview to the timing of the method. Waiting time estimation is a data output from the lead vector module, and the progress of time seems to be relevant. The figures illustrate the time intervals in relation to each other. The left-to-right-going time line uses indices, 1, 2, i, and N.

As explained above, TF is the frame time. Every TF, a new frame is available in the frame sequence (140 in FIG. 1). Frames 1 to N are considered here. The time is takes the network to communicate frames from the camera to the computer is neglected.

For evaluating the history of vectors, more time is needed. For example, the history is obtained by averaging over a number H frames. With the assumption that every available frame is used, averaging H=1000 frames requires TH=100 seconds (history time TH=TF*H).

While the flow module needs about H frames to provide an initial flow 155, the lead vector module needs at least that number of H frames to start calculating. With the method steps being continuously performed, movement time estimates TM can be obtained (after concatenating) when N frames (N>=H) had been received. The figure illustrates the exemplary object moving from the center position 825A to the target position 825B.

In the figure, history time TH is illustrated to be shorter than the movement time; TH could be larger than TM.

Figure 9:
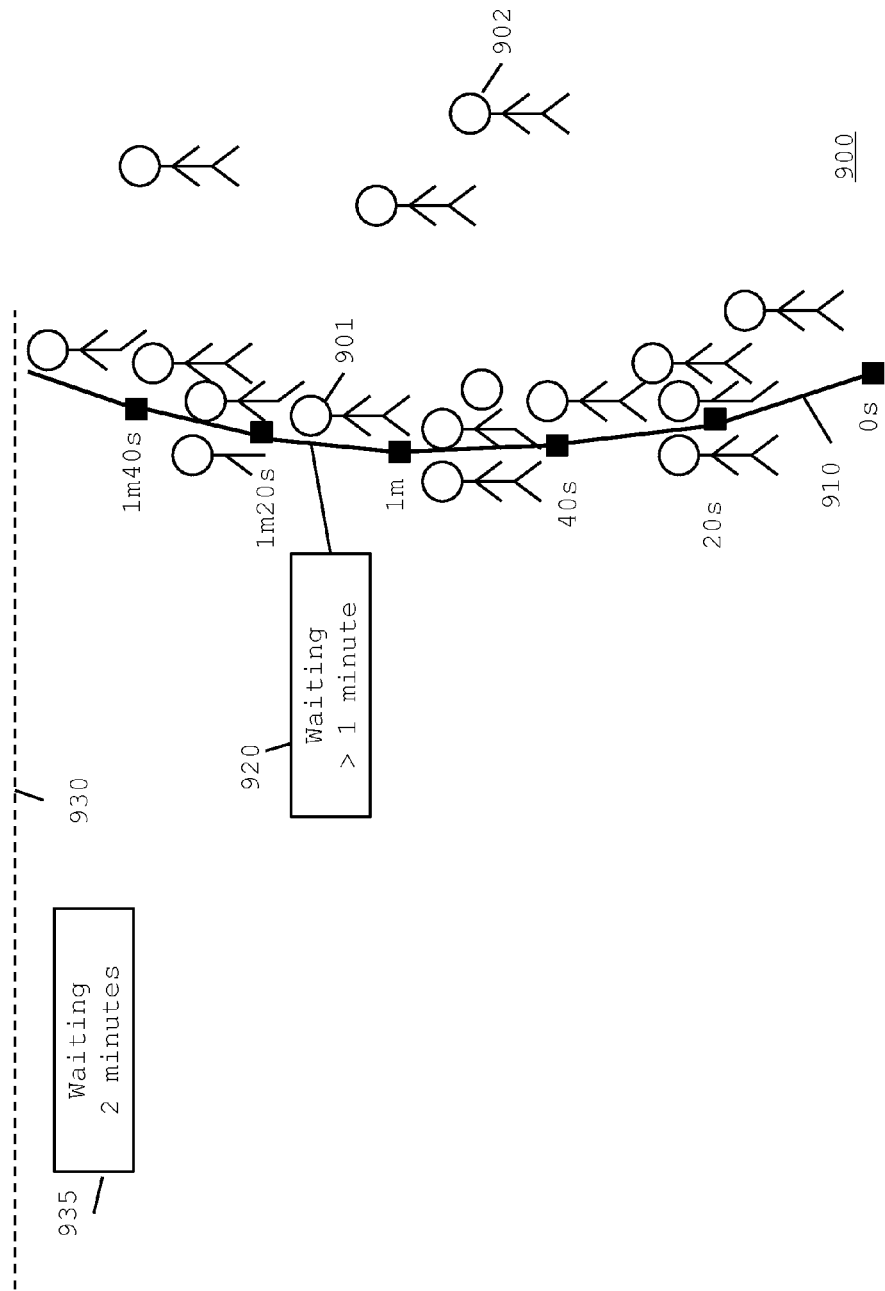
FIG. 9 is a frame with superimposed information for presentation to an operator.

FIG. 9 is a frame with superimposed information for presentation to an operator. As mentioned, there is no need to present the optical flow or movement characteristics visually to a human operator, but that might be convenient to do so. The figures illustrates frame 900 on screen. In the example, the camera could be mounted above the counter so that it captures persons moving to the counter. Frame 900 shows persons 901 in a queue and persons 902 outside the queue. It is convenient to show the persons in real-time without playing back a video. To present the movement characteristics, the figures illustrates 3 options.

In the first option, the path (cf. FIG. 6) could be superimposed as path 910, usually with a color that contrasts to the clothing of the persons. Estimated movement times could be added by digits next to the path, such as 0 s, 20 s, 40 s, 1 m, 1 m20 s and so on.

In the second option, the operator could move a pointer (e.g. a mouse pointer) over the screen and read the movement time TM(Y) for different positions along the queue, for example in a mouse-over box 920. Moving the pointer over non-queue person 902 would give an indication that a queue is not available.

In a third option, some coordinate lines that correspond to movement time (waiting time) could be highlighted. In the example, line 930 corresponds to 2 minutes waiting, label 935 is presented as well.

Having described details, the description now gives a summary for further embodiments with optional features, in references to FIGS. 1-9.

For example, from the queue movement characteristics, the number of persons in a queue could be estimated. The path (cf. FIG. 6, the concatenated vectors) indicates movement. In combination with the optical flow (cf. FIG. 2), the width of the queue (if viewed from above) could be derived. Much simplified, length and width result in a queue area. Taking an average size of a person into account, for example, the area of a person in the view from above (in data coordinates), the number of persons in the queue could be calculated (queue area over person area).

As mentioned, in the examples, the camera is not moving. The camera has a fixed position, for example, at the ceiling of a building. But further embodiments could deal with a moving camera that changes its position. The transfer function (X,Y) (U,V) just has to consider the camera movement, for example, by taking a camera offset into account. In the alternative, only images belonging to a substantially identical camera position could be added to the frame sequence (cf. 140, FIG. 1).

The camera itself could be replaced by other image capturing devices that monitor the area and provide image data. For example, an array of pressure sensors in the floor of the surveillance area could indicate the presence of persons. The image—although not obtained through optical lenses—would be processed likewise. Other options include the use of time-of-flight cameras, or thermographic cameras.

Multiple queues leading to multiple targets or multiple queues leading to a single target could be considered likewise. As an example, vehicles sometimes wait in different lanes (i.e. queues in areas with specialized sub-areas) in front of a toll gate (i.e., a target, or "counter"). The approach could identify movement speed differences between the lanes so that vehicle drivers can be advised to change lanes, of appropriate.

In case that persons do not form a queue, but form a crowd, properties of the crowd behavior such the fastest moving persons could be identified. That is potentially of interest for security reasons.

From the queue movement characteristics, the existence of a queue can be determined. In a first step, the probabilities that pixels belong to a queue path are determined. In a second step, the probabilities are segmented to different regions, and in a third step, destination and tail regions are computed.

Surveillance areas are usually monitored by multiple cameras, so that portions of the same queue would appear in different frame sequences. For example, a very long queue could go from one room to another room. Reference points, in the sense of intermediate targets could be used to link movement characteristics from separate frame sequences together.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site (e.g., in the vehicle) or distributed across multiple sites (e.g. central computer) and interconnected by a communication network. The methods can all be executed by corresponding computer products on the respective devices.

Method steps of the invention can be performed by one or more programmable processors executing a computer program to perform functions of the invention by operating on input data and generating output. Method steps can also be performed by, and an apparatus of the invention can be implemented as, special purpose logic circuitry, e.g., an FPGA (field programmable gate array), a DSP (digital signal processor) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also be provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a liquid crystal display (LCD) monitor, for displaying information to the user and an input device such as a keyboard, touchscreen or touchpad, a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Mobile devices can be, for example, smart phones, tablet PCs or any other handheld computing device. The components of the system can be interconnected by any form or medium of digital data communication, e.g., a communication network. Examples of communication networks include a local area network (LAN) and a wide area network (WAN), e.g., the Internet or wireless LAN or telecommunication networks. The computing system can include clients and servers. A client and server are generally remote from each other and typically interact through a communication network. The relationship of client and server arises by virtue of computer programs running on the respective computers and having a client-server relationship to each other, or a peer-to-peer relationship.

The invention claimed is:

1. A computer-implemented method for deriving movement characteristics for a plurality of queue objects that move inside a surveillance area to a target; the method comprising:
   receiving a sequence of image frames that represent the surveillance area;
   calculating flow vectors that indicate an optical displacement for the sequence of image frames;
   extending one of the flow vectors as a lead vector in a first extension direction and in a second extension direction;
   determining a first intermediate vector and a second intermediate vector by using flow vectors along the first extension and by using flow vectors along the second extension;
   selecting one the intermediate vectors as the new lead vector;
   repeating extending, determining and selecting to concatenate the lead vectors to the movement characteristics.

2. The method of claim 1, wherein extending the lead vector is initialized by a flow vector that corresponds to location coordinates in the surveillance area near the target.

3. The method of claim 2, wherein extending the lead vector is performed for directions that go away from the target.

4. The method according to claim 1, wherein the first intermediate vector and the second intermediate vector are calculated by interpolation.

5. The method according to claim 4, wherein the interpolation is a bilinear interpolation.

6. The method according to claim 1, wherein selecting one the intermediate vectors as lead vector is performed for the intermediate vector that represents the larger displacement of the intermediate vectors.

7. The method according to claim 1, wherein the image frames in the sequence of frames have data coordinates that are pixels.

8. The method according to claim 1, wherein the movement characteristics includes a movement time (TM) in correspondence to the number of lead vectors.

9. The method according to claim 8, wherein the movement time (TM) is related to location coordinates of the queue object and of the target.

10. The method according to claim 1, wherein the characteristics include a queue length.

11. The method according to claim 1, wherein the characteristics includes the identification of a queue tail as a location in that the flow vectors following the movement characteristics go below a threshold value.

12. A non-transitory program storage device readable by machine, tangibly embodying a program of instructions executable by the machine that performs the steps of a computer-implemented method for deriving movement characteristics for a plurality of queue objects that move inside a surveillance area to a target, the method being implemented by a processor to perform steps comprising:

receiving a sequence of image frames that represent the surveillance area;

calculating flow vectors that indicate an optical displacement for the sequence of image frames;

extending one of the flow vectors as a lead vector in a first extension direction and in a second extension direction;

determining a first intermediate vector and a second intermediate vector by using flow vectors along the first extension and by using flow vectors along the second extension;

selecting one the intermediate vectors as the new lead vector;

repeating extending, determining and selecting to concatenate the lead vectors to the movement characteristics.

13. A computer for deriving movement characteristics for a plurality of queue objects that move inside a surveillance area to a target; the computer comprising:

a memory; and a processor, coupled to the memory, configured to:

receive a sequence of image frames that represent the surveillance area and to calculate flow vectors that indicate an optical displacement for the sequence of image frames; and extend one of the flow vectors as a lead vector in a first extension direction and in a second extension direction, to determine a first intermediate vector and a second intermediate vector by using flow vectors along the first extension direction and by using flow vectors along the second extension direction, to select one the intermediate vectors as a new lead vector, and to concatenate lead vectors to the movement characteristics.

14. The computer of claim 13, wherein the processor is further configured to initialize the extension by a flow vector that corresponds to location coordinates in the surveillance area near the target.

15. The computer program product of claim 12, wherein at least one of the following holds true:

extending the lead vector is initialized by a flow vector that corresponds to location coordinates in the surveillance area near the target, and wherein extending the lead vector is performed for directions that go away from the target;

the first intermediate vector and the second intermediate vector are calculated by interpolation, and wherein the interpolation is a bilinear interpolation;

selecting one the intermediate vectors as lead vector is performed for the intermediate vector that represents the larger displacement of the intermediate vectors;

the image frames in the sequence of frames have data coordinates that are pixels;

the movement characteristics includes a movement time (TM) in correspondence to the number of lead vectors, and wherein the movement time (TM) is related to location coordinates of the queue object and of the target;

the characteristics include a queue length;

the characteristics includes the identification of a queue tail as a location in that the flow vectors following the movement characteristics go below a threshold value.

\* \* \* \* \*

UNITED STATES PATENT AND TRADEMARK OFFICE
CERTIFICATE OF CORRECTION

PATENT NO. : 9,679,200 B2  
APPLICATION NO. : 14/415585  
DATED : June 13, 2017  
INVENTOR(S) : Markus Schlattmann et al.

Page 1 of 1

It is certified that error appears in the above-identified patent and that said Letters Patent is hereby corrected as shown below:

On the Title Page

Delete the entire data at Item "(30) Foreign Application Priority Data", and insert as follows:

--(30)   Foreign Application Priority Data

Jul. 18, 2012    (EP)......................... 12176857--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*